United States Patent [19]

Benedick

[11] 4,267,152

[45] May 12, 1981

[54] ANTI-POLLUTION THERMAL REGENERATION APPARATUS

[75] Inventor: Edward H. Benedick, Morristown, N.J.

[73] Assignee: Regenerative Environmental Equipment Co., Inc., Morris Plains, N.J.

[21] Appl. No.: 60,494

[22] Filed: Jul. 25, 1979

[51] Int. Cl.³ .............................................. F23G 7/06
[52] U.S. Cl. ..................................... 422/111; 422/183
[58] Field of Search ............... 422/109, 111, 182, 183; 110/203, 212, 215

[56] References Cited

U.S. PATENT DOCUMENTS 3,993,449  11/1976  Childs ............................. 422/183 X
4,036,576  7/1977   McCracken ..................... 422/183 X

FOREIGN PATENT DOCUMENTS 2301445  7/1974  Fed. Rep. of Germany ........... 422/183

Primary Examiner—William A. Cuchlinski, Jr.
Attorney, Agent, or Firm—Nelson E. Kimmelman

[57] ABSTRACT

An incineration system for industrial effluents and the like in which, to promote more uniform heat distribution in a large combustion chamber ordinarily heated by a single burner, some of the primary fuel gas for the burner is fed to the combustion chamber along with the effluent so that they are both uniformly oxidized throughout the chamber.

10 Claims, 1 Drawing Figure

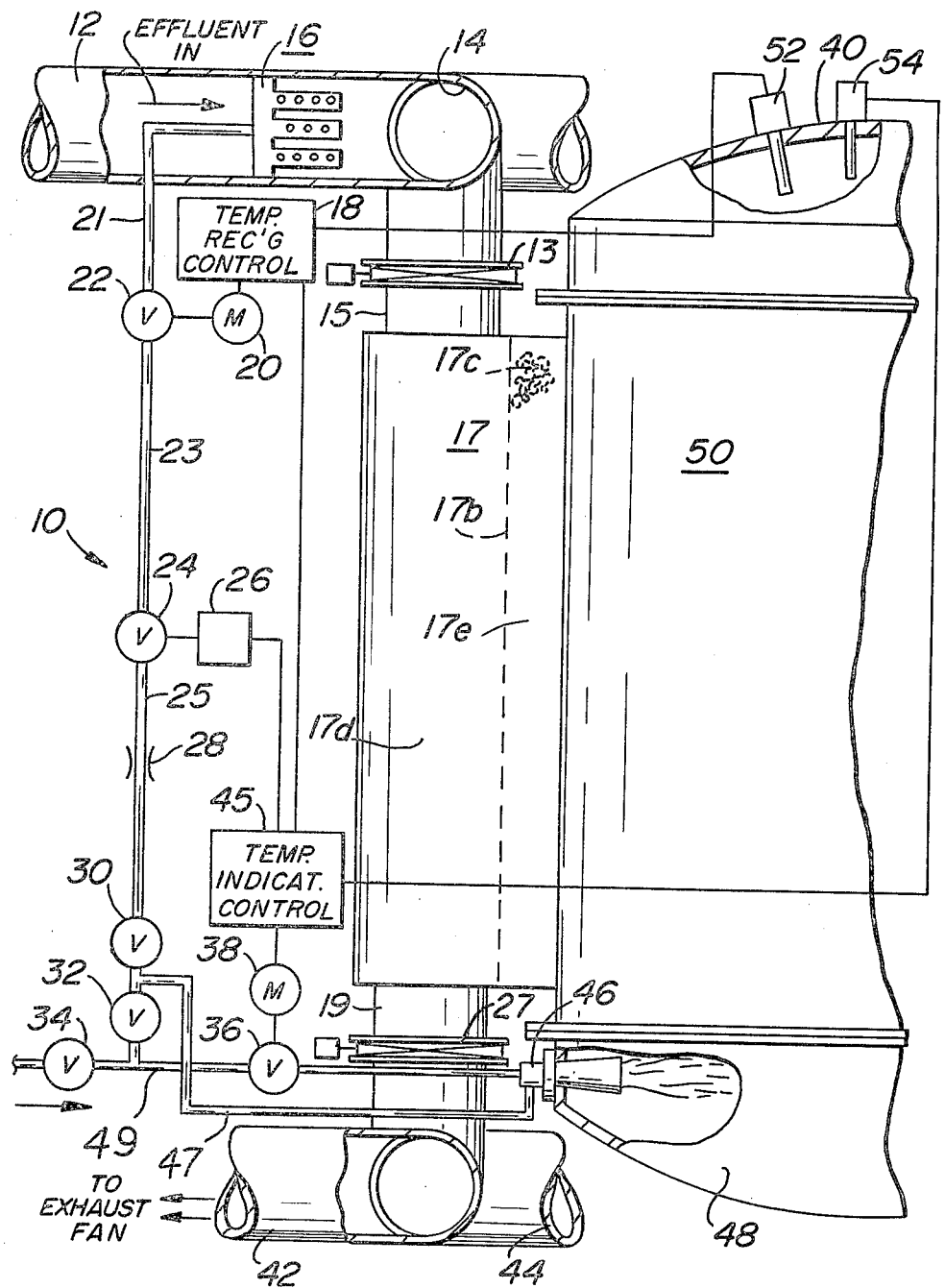

ANTI-POLLUTION THERMAL REGENERATION APPARATUS

BACKGROUND OF THE INVENTION

1. Field of the Invention

This invention relates to incineration apparatus and in particular to such apparatus having a large combustion chamber with a single burner in which the temperature gradient is quite large.

2. Prior Art

Incineration apparatus is known in which an industrial effluent is introduced in order to reduce pollution by breaking down its components to simpler and harmless gases. Some such incineration apparatus uses the principle of thermal regeneration so that the heat generated in the combustion or oxidation chamber is largely recovered before the decomposed effluent is drawn out and into the exhaust stack. One such thermal regeneration system is illustrated in U.S. Pat. No. 3,895,918 issued to James H. Mueller on July 22, 1975. In that system, a number of heat-exchange sections are arranged about and in communication with a central, high-temperature chamber. Each heat exchange section includes a heat-exchange bed of a large number of refractory elements made of ceramic or the like ("stones") confined by inward and outward perforated retaining walls. The effluent to be purified is applied to an inlet duct ring which has branch ducts that distribute the effluent to selected ones of those heat exchange sections whenever their respective associated inlet valves are opened. In such apparatus, the effluent is made to traverse the heat-exchange bed which may have a front-to-back temperature gradient by virtue of the heat generated in the central combustion chamber with which it communicates.

The combustion chamber itself may be quite large with a single burner located toward its bottom. As a result, the temperature in the chamber is quite uneven with the chamber being cooler towards its top and warmer at the bottom where the burner is. Thus, it is possible that some of the effluent drawn through the heat-exchange chamber into the combustion chamber may not come up to the requisite temperature for substantially complete oxidation of its components so that some of these incompletely burned compounds may go out of the stack with the rest of the exhaust.

One possible remedy is to use several burners distributed at various points throughout the combustion chamber. However, this is a relatively expensive solution inasmuch as each burner requires its own set of valves, controls, heat sensors, and the like. Moreover, the presence of several burners does not insure uniformity of heat in the chamber. Rather, there will be created several zones with varying temperature gradients in the chamber. Furthermore, each burner will require its own supply of ambient combustion air which is relatively cool compared with the desired temperature within the oxidation chamber.

It is therefore among the objects of the present invention to provide a system for insuring greater heat uniformity and hence greater thermal efficiency of the heat incineration apparatus, especially in large volume apparatus.

Another object of the present invention is to help to minimize the emission into the air of incompletely oxidized industrial effluents.

Still another object of the invention is to provide a uniform-heat-distribution incinerator at a cost lower than alternative approaches.

A further object of the invention is to provide incineration apparatus wherein the thermal efficiency of the system is enhanced by reduction of the use of ambient combustion air in alternative multi-burner systems.

Other objects of the invention will be apparent to those skilled in the art upon perusal of the drawings, specification and claims in this case.

SUMMARY OF THE INVENTION

Incineration apparatus for purification of noxious effluents or the like in which, to insure more uniformly complete combustion in a chamber, predetermined amounts of a raw fuel gas are mixed with the effluent before application to the chamber.

BRIEF DESCRIPTION OF THE DRAWING

The sole FIGURE of the drawing is a schematic, fragmentary and partly sectional view of a preferred embodiment of the present invention.

DETAILED DESCRIPTION OF THE DRAWING

As stated in the aforementioned Mueller patent, one known thermally regenerative incineration apparatus comprises a central, high temperature oxidation chamber 50 having a burner 46 located toward the bottom thereof with which a plurality of heat-exchanger sections, such as the section 17, communicate. The section 17 includes a heat-exchange bed 17e of ceramic elements or "stones" 17c retained between a front (not shown) and back apertured wall (17b.). Effluent from an industrial process is applied to one or more of the sections 17 by way of an inlet duct 12 which communicates with an inlet duct ring 14. Vertical ducts such as duct 15 couple the ring to the space 17d in back of (outwardly of) the outer retaining wall 17b. Vertical outlet ducts 19 couple the space 17d through outlet valves 27 to the outlet duct ring 44. The exhaust duct ring 44 is itself coupled by a duct 42 to the exhaust fan (not shown) whose output is connected to a stack. A solenoid-controlled valve 13 in duct 15 regulates the input to the section 17. When valve 13 is open, and when the associated outlet valve 27 is closed, the negative pressure induced in the central chamber 50 by an exhaust fan (not shown) coupled to the outlet duct ring 44 via exhaust duct 42 conventionally draws the effluent from space 17d through the bed 17e into the central incineration chamber 50 and thence out of the system via a different, relatively cool bed associated with another one of the sections 17.

The burner 46 is supplied with fuel such as natural gas by way of inlet valve 34 located in the main burner supply line 49. Another modulating valve 36, 38 is in series with valve 34 and is coupled to temperature indicating control 45. The latter has a direct connection to a thermocouple heat-sensing element 54 located in the dome 40 of the chamber 50. This thermocouple-control combination is conventionally so arranged as to permit a modulated flow of fuel gas to the burner 46 to maintain an operating temperature as registered at the top of the chamber 50 of about 1450° F. It also acts to shut the burner down below 1400° F. in one typical set of operating parameters. It may also act to shut the burner down if the temperature of the chamber 50 exceeds a predetermined maximum. A supply of pilot gas for the pilot of the burner is taken off from gas line 49 after valve 34 and is carried in line 23 via valve 32 and pilot line 47 to the burner. Valve 30 may be a manual valve which may be turned off when it is desired to perform maintenance on the burner or in the system as a whole.

If the chamber 50 is very tall, the existence of a single burner 46 in the bottom portion 48 will have produced a wide disparity in the temperatures in the chamber ranging from the highest at the bottom to the lowest at the top with the result that some of the effluent passing from left to right through the heat-exchange bed 17e may not be subject to complete combustion. Therefore, when it leaves the chamber 50, it will ultimately be expelled out of the system through the exhaust ring 44 together with the purified effluent.

In accordance with the present invention, some of the fuel gas is also diverted from the line 49 via branch pipe 23 and supplied to the chamber 50 with the incoming effluent. The auxiliary line 23 has a restricting aperture indicated schematically at numeral 28 to limit operation of the system to 5–6% LEL (Lower Explosive Limit). Line 23 also includes a solenoid-controlled safety valve 24,26 which is coupled to a control 45 so that the former will prevent fuel gas from being applied directly to chamber 50 until the temperature therein attains at least 1400° F. This temperature insures that the raw gas will auto-ignite when applied to chamber 50 and this tends to prevent explosions.

In series with valve 24 is a modulating valve 22 and its operator 20 which is governed by a temperature-recording control 18. Control 18 is coupled to a second thermocouple heat sensor 52 located in the dome 40. This control is also coupled to control 45 and is set so that its operating setting is above the operating setting of control 45, i.e., over 1450° F. It is installed so that it can override control 45 and its minimum lower alarm point is at least as high as the lower setting of control 45. Thus, the modulating valve assembly 20, 22 will permit the supply of enough raw natural gas, for example, to the gas distributor or manifold 16 in the inflow of effluent in inlet ring 14 to bring the central chamber 50 up to about 1500°–1600° F. and to maintain it there. At the same time the burner 46 would then be on low fire because its associated controller may be set to turn down the main gas supply to it when the temperature exceeds 1450° F., for example. In this way it is the effluent which furnishes most of the combustion air for the burner which is operating substantially stoichiometrically, using a minimum of ambient air.

The use of this system is highly advantageous, especially where the incinerator has a large volume combustion chamber and a relatively localized heat source. In such installations there would be a large heat gradient throughout the chamber resulting in incomplete combustion of at least part of the incoming effluent. Mixing that effluent with some of the fuel gas before application to the chamber enables uniform auto-ignition of the mixture uniformly throughout the chamber. Since this obviates more burners to solve this problem, less ambient air, which is cool, is required than for the plural burner alternative. This makes for more thermal efficiency, especially since the main burner is usually on low fire once the rare gas fuel is added and is operating stoichiometrically with minimum ambient combustion air.

Other modifications of the system which are embraced within the general scope of the invention will occur to those skilled in the art upon perusal of the present specification and drawings. Consequently, I desire that this invention be limited solely by the claims which follow.

I claim:

1. Incineration apparatus to which noxious or polluting effluents produced by an industrial process or the like are applied for purification and in which there is a combustion chamber normally heated by a main heat source, the combination comprising:
    (a) means for detecting when the temperature within said chamber attains a predetermined level,
    (b) means outside of said combustion chamber for uniformly distributing a combustible fuel gas with substantially all of said effluents when said predetermined level has been attained and detected by said detecting means, and
    (c) means coupled to said means for uniformly distributing said fuel gas for applying said effluents with or without said uniformly mixed fuel gas into said chamber.

2. The combination according to claim 1 with the addition of means for reducing the heat produced by said main source when combustion of said mixture occurs in said chamber.

3. The combination according to claim 1 wherein said heat source is a gas-fired burner supplied with a gas fuel and wherein said means for uniformly distributing includes means for receiving a part of said fuel and distributing it substantially uniformly in the inflow of said effluents prior to application to said combustion chamber.

4. The combination according to claim 3 with the addition of means for preventing mixture of said fuel gas with said effluent when the temperature in said chamber exceeds a predetermined limit.

5. Incineration apparatus according to claim 1 in which there is a single combustion chamber and in which there is a single means for mixing a combustible fuel gas with said effluents produced by said industrial process or the like.

6. Thermal regeneration incineration apparatus for oxidizing noxious effluents or the like, comprising:
    (a) a combustion chamber,
    (b) a fuel gas-fired burner to heat said chamber,
    (c) a first heat sensing means in said chamber,
    (d) first means for supplying said fuel gas to said burner,
    (e) means associated with said sensing means for modulating the amount of fuel gas applied to said chamber as a function of the temperature therein,
    (f) mixing means outside of said chamber and associated with said supplying means to which said effluents are applied for uniformly mixing said fuel gas with substantially all of said effluent,
    (g) second means for supplying said fuel gas to said mixing means,
    (h) a second heat-sensing means in said chamber, and
    (i) means coupled to said heat-sensing means and to said second means for modulating the supply of said fuel gas to said mixing means as a function of the temperature in said chamber as sensed by said second heat sensing means.

7. The apparatus according to claim 6 wherein said means for modulating the amount of fuel gas applied to said chamber and said means for modulating the supply of fuel gas to said mixing means have their operation coordinated.

8. The apparatus according to claim 7 wherein fixed means are provided to control the maximum rate of flow of said fuel gas in said means for supplying said fuel gas to said mixing means.

9. The apparatus according to claim 6 wherein said first and second heat sensing means are thermocouples which are installed in said chamber and wherein said means associated with said sensing means and said means coupled to said heat-sensing means each include a modulating valve and a controller which is coupled to a different one of said thermocouples.

10. Thermal regeneration apparatus according to claim 6 in which there is a single combustion chamber.

* * * * *